(12) United States Patent
Weng

(10) Patent No.: US 9,026,493 B1
(45) Date of Patent: May 5, 2015

(54) MULTI-MASTER RDBMS IMPROVEMENTS FOR DISTRIBUTED COMPUTING ENVIRONMENT

(75) Inventor: Dennis Zhi Weng, San Jose, CA (US)

(73) Assignee: Google Inc., Mountain View, CA (US)

(*) Notice: Subject to any disclaimer, the term of this patent is extended or adjusted under 35 U.S.C. 154(b) by 240 days.

(21) Appl. No.: 13/036,933

(22) Filed: Feb. 28, 2011

(51) Int. Cl.
G06F 17/30 (2006.01)

(52) U.S. Cl.
CPC ............... G06F 17/30575 (2013.01)

(58) Field of Classification Search
None
See application file for complete search history.

(56) References Cited

U.S. PATENT DOCUMENTS

| | | | | |
|---|---|---|---|---|
| 6,018,742 | A * | 1/2000 | Herbert, III | 1/1 |
| 7,269,648 | B1 * | 9/2007 | Krishnan et al. | 709/224 |
| 8,055,689 | B1 * | 11/2011 | Wookey | 707/814 |
| 8,745,127 | B2 * | 6/2014 | Gopal et al. | 709/203 |
| 8,874,626 | B2 * | 10/2014 | Avati et al. | 707/827 |
| 2003/0177150 | A1 * | 9/2003 | Fung et al. | 707/204 |
| 2004/0054644 | A1 * | 3/2004 | Ganesh et al. | 707/1 |
| 2004/0139083 | A1 * | 7/2004 | Hahn et al. | 707/100 |
| 2006/0015546 | A1 * | 1/2006 | Sawadsky et al. | 707/204 |
| 2006/0080493 | A1 * | 4/2006 | Leon et al. | 711/4 |
| 2007/0055765 | A1 * | 3/2007 | Lisiecki et al. | 709/223 |
| 2007/0157155 | A1 * | 7/2007 | Peters | 717/100 |
| 2007/0283194 | A1 * | 12/2007 | Villella et al. | 714/57 |
| 2008/0195616 | A1 * | 8/2008 | Rowley | 707/8 |
| 2009/0037553 | A1 * | 2/2009 | Yuan et al. | 709/209 |
| 2009/0198702 | A1 * | 8/2009 | Novik et al. | 707/10 |
| 2010/0125619 | A1 * | 5/2010 | Ferre et al. | 707/828 |
| 2010/0169284 | A1 * | 7/2010 | Walter et al. | 707/682 |
| 2010/0211554 | A1 * | 8/2010 | Reid et al. | 707/703 |
| 2011/0231447 | A1 * | 9/2011 | Starkey | 707/792 |
| 2012/0005542 | A1 * | 1/2012 | Petersen et al. | 714/48 |
| 2012/0179646 | A1 * | 7/2012 | Hinton et al. | 707/607 |

OTHER PUBLICATIONS

Valduriez et al. "Data Management in Large-scale P2P Systems," LNCS, vol. 3402, pp. 109-122, Springer, Berlin Heidelberg NY (2005).*

* cited by examiner

*Primary Examiner* — Richard Bowen
(74) *Attorney, Agent, or Firm* — Honigman Miller Schwartz and Cohn LLP

(57) ABSTRACT

A system and method is disclosed, which facilitates data replication in a multi-master Relational Database Management Systems (RDBMS). An in-memory attribute is stored at a server of a multi-master database system. The in-memory attribute is associated with an operation, a record, and a global unique identifier (GUID) assuring uniqueness across the database system. The in-memory attribute indicates disallowing at the server additional requested operations associated with the record. The operation associated with the in-memory attribute is performed at the server and logged in a global accessible log associated with the server and available to other servers of the database system. The in-memory attribute is removed from the server based on a global accessible log associated with at least one of the other servers.

31 Claims, 7 Drawing Sheets

200

112
Data Table

| 202 | 204 | 206 | 208 | |
|---|---|---|---|---|
| GUID | User_email | First name | Last name | ... |
| 1217897128 | d@domain.com | John | Doe | ... |
| ⋮ 212 | ⋮ 214 | ⋮ 216 | ⋮ 218 | ⋮ |

| Server_ID 304 | Nodes 306 | Table_Column 308 | Timestamp 310 | Value 312 | Left/Count 314 | Log_ID 316 |
|---|---|---|---|---|---|---|
| A 318 | 10 320 | User_email 322 | 1287682532 324 | d@domain.com 326 | 10 328 | 012345-123 330 |
| ... | ... | ... | ... | ... | ... | ... |

300

302

Memory 114

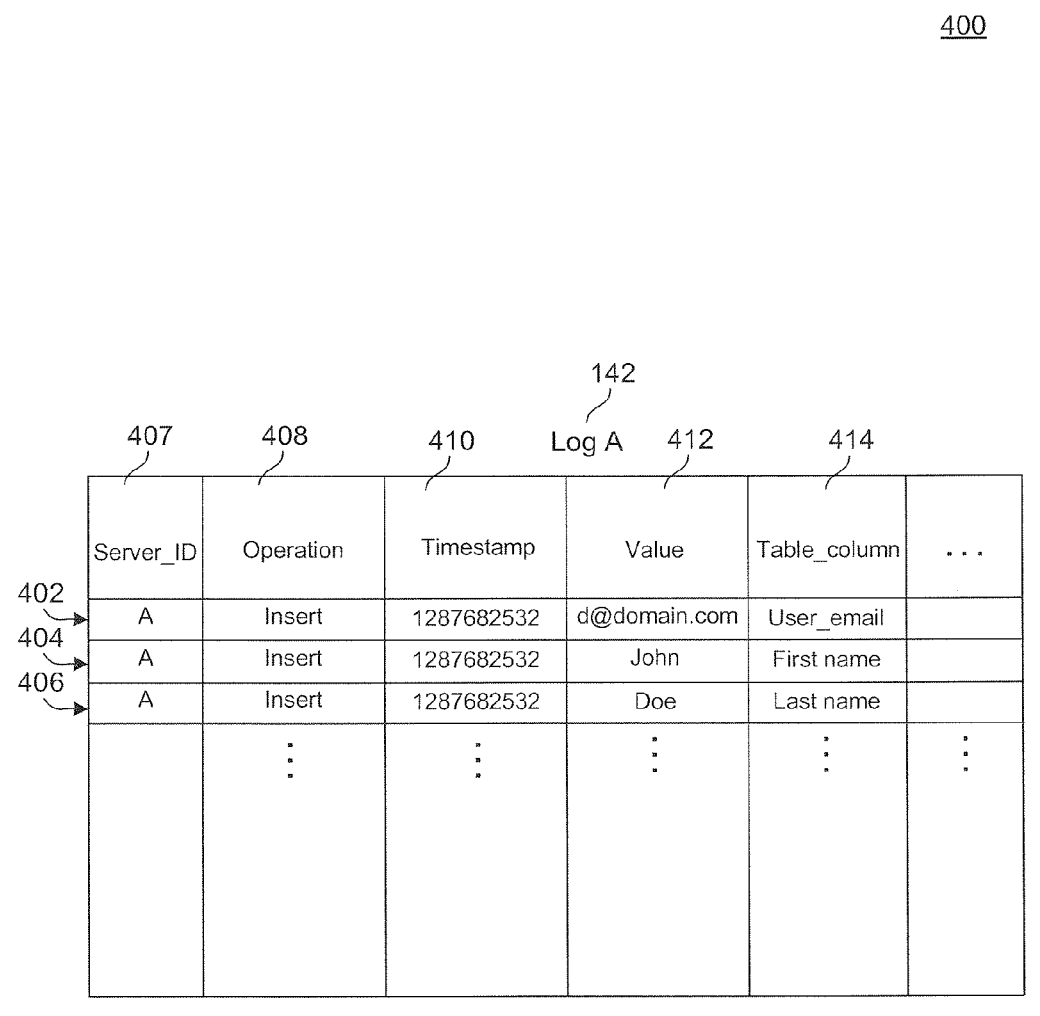

142
Log A

| | 407 | 408 | 410 | 412 | 414 | |
|---|---|---|---|---|---|---|
| | Server_ID | Operation | Timestamp | Value | Table_column | ... |
| 402 → | A | Insert | 1287682532 | d@domain.com | User_email | |
| 404 → | A | Insert | 1287682532 | John | First name | |
| 406 → | A | Insert | 1287682532 | Doe | Last name | |
| | ⋮ | ⋮ | ⋮ | ⋮ | ⋮ | ⋮ |

FIG. 4

MULTI-MASTER RDBMS IMPROVEMENTS FOR DISTRIBUTED COMPUTING ENVIRONMENT

FIELD

Embodiments of the present invention generally relate to data replication in multi-master database systems and applications thereof.

BACKGROUND

Data replication for servers in Relational Database Management Systems (RDBMS) may involve master-slave or multi-master configurations. Conventional master-slave configurations do not provide a truly distributed computing environment, and conventional multi-master configurations may be associated with management complexity imposed by data conflicts, data loss/recovery and other data management issues that reduce data processing efficiency. Furthermore, conventional multi-master configurations for RDBMS data replication may burden code writers with a need to customize code to address network delay, row-locking issues in a global environment, and other imposed difficulties associated with conventional data replication.

Conventional multi-master replication environments can be constrained by data conflicts. For example, when an attempt is made to insert two "identical records" into two or more separate database instances at approximately the same time in conventional systems, one of the inserted "identical records" must be chosen over the other according to a "primary key constraint"). Conventional methods to address such data conflicts may discard records based on timestamps (time priority) or location (site priority), and some methods may suspend data replication entirely and require manual intervention to resolve data conflict issues.

BRIEF SUMMARY

Embodiments of the present invention relate to data replication in multi-master database systems, and applications thereof. In an embodiment, a method includes storing an in-memory attribute at a server of a multi-master database system. The in-memory attribute is associated with an operation, a record, and a global unique identifier (GUID) assuring uniqueness across the database system. The in-memory attribute indicates disallowing at the server additional requested operations associated with the record. The method further includes performing at the server the operation associated with the in-memory attribute, logging the performed operation in a global accessible log associated with the server and available to other servers of the database system, and removing the in-memory attribute from the server based on a global accessible log associated with at least one of the other servers.

In another embodiment, a system includes a server to store an in-memory attribute associated with an operation, a record, and a global unique identifier (GUID) assuring uniqueness across a multi-master database system associated with the server. The in-memory attribute indicates disallowing at the server additional requested operations associated with the record. The server is configured to perform the operation associated with the in-memory attribute, and the server is configured to log the performed operation in a global accessible log associated with the server and available to other servers of the database system. The server is configured to remove the in-memory attribute from the server based on a global accessible log associated with at least one of the other servers.

In another embodiment, a system includes one or more servers, each configured to store an in-memory attribute associated with an operation, a record, and a global unique identifier (GUID) assuring uniqueness across a multi-master database system associated with the server. The in-memory attribute indicates disallowing at the server additional requested operations associated with the record. The system includes a cloud computing file system to store one or more global accessible logs associated with the one or more servers. A server is configured to perform an operation associated with an in-memory attribute, and log the performed operation in a global accessible log associated with the server. The global accessible log may be stored at the cloud computing file system and available to other servers of the database system. The server is configured to remove the in-memory attribute from the server based on a global accessible log associated with at least one of the other servers.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements.

FIG. 2 is a diagram illustrating an example data table, in accordance with an embodiment.

FIG. 3 is a diagram illustrating an example memory containing an in-memory attribute, in accordance with an embodiment.

FIG. 4 is a diagram illustrating an example log, in accordance with an embodiment.

Embodiments of the present invention are described with reference to the accompanying drawings. The drawing in which an element first appears is typically indicated by the leftmost digit or digits in the corresponding reference number. The drawings are not necessarily drawn to scale.

DETAILED DESCRIPTION OF THE INVENTION

Embodiments of the present invention relate to multi-master data replication systems and methods, and applications thereof. In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of master servers and cloud computing file systems may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Multi-Master Database System

Figure 1:
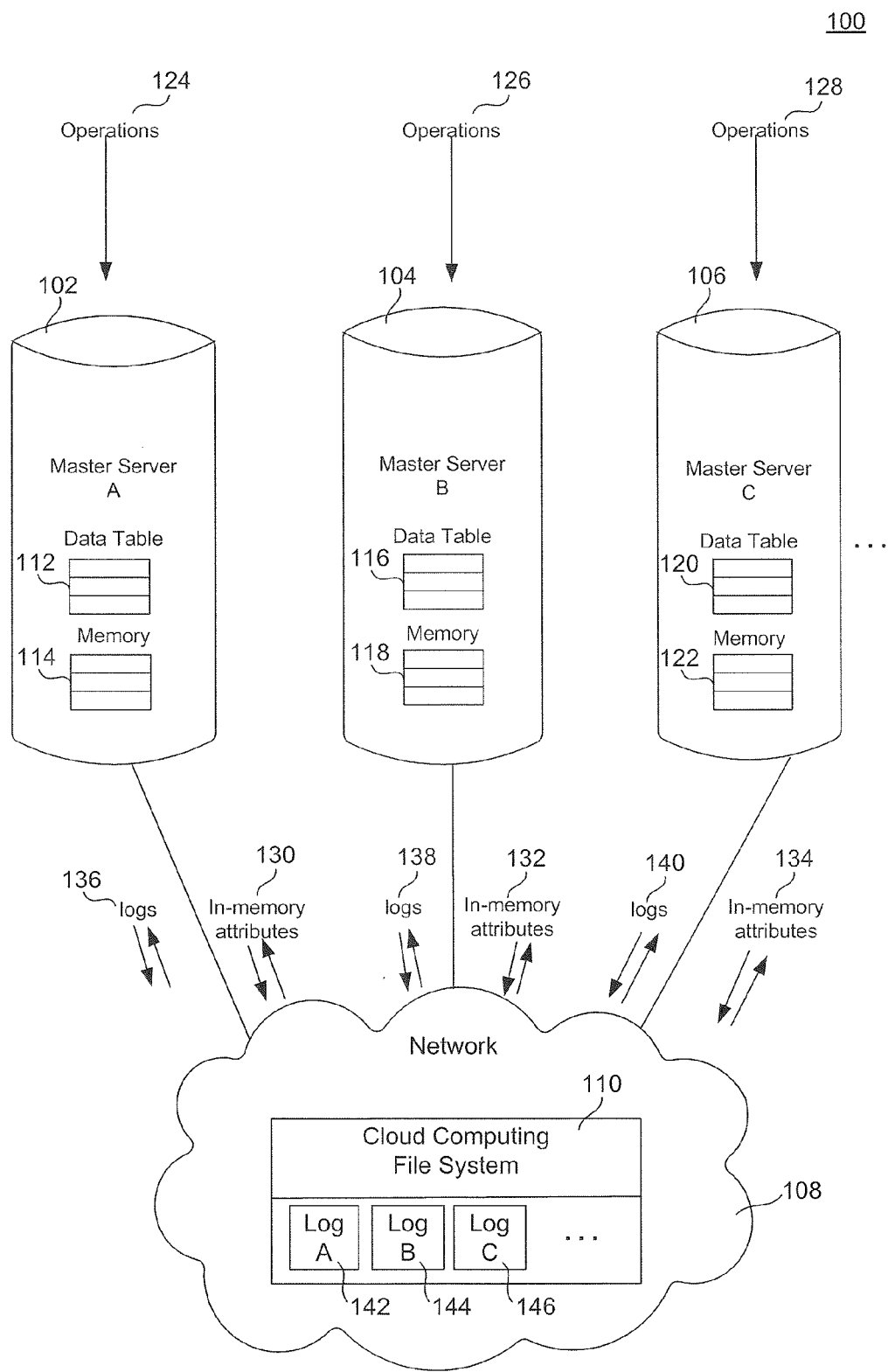
FIG. 1 is a diagram of an exemplary multi-master database system, in accordance with an embodiment.

FIG. 1 is a diagram of an exemplary multi-master database system, in accordance with an embodiment 100. Although FIG. 1 illustrates three master servers, embodiments can include an arbitrary number of master servers and non-master servers. Master server A 102, master server B 104, and master server C 106 are coupled to network 108. Network 108 includes a cloud computing file system 110. Master server A 102 includes data table 112 and memory 114. Master server B 104 includes data table 116 and memory 118. Master server C 106 includes data table 120 and memory 122.

Master server A 102, master server B 104, and master server C 106 are configured to receive operations 124, 126, and 128, respectively. Master server A 102, master server B 104, and master server C 106 are configured to send and receive in-memory attributes 130, 132, and 134, respectively. Master server A 102, master server B 104, and master server C 106 also are configured to read and write logs 136, 138, and 140, respectively. In the illustrated embodiment, logs are read from and written to cloud computing file system 110 as log A 142, log B 144, and log C 146. Logs can be stored using alternative arrangements, such as storing each log on its associated master server.

The embodiment of FIG. 1 can provide a multi-master replication environment, while removing the possibility of having a data conflict before data is committed by ensuring that no "identical records" are inserted from different servers. Furthermore, implementations can be transparent to code writers while reducing management complexity. These benefits can be provided in the illustrated embodiment by using a global unique identification (GUID), an in-memory attribute, and a globally accessible log.

The GUID can be associated with records stored in a data table 112, 116, and 120 of servers 102, 104, and 106. In-memory attributes can be associated with operations 124, 126, and 128 received and/or performed at the servers 102, 104, and 106. In-memory attributes 130, 132, and 134 also can be broadcasted and/or received by servers 102, 104, and 106. Globally accessible log A 142, log B 144, and log C 146 can be read, appended, and/or applied by servers 102, 104, and 106 to synchronize data throughout the embodiment 100. Reading, appending, and/or applying globally accessible log A 142, log B 144, and log C 146 is represented in FIG. 1 by double-arrows associated with logs 136, logs 138, and logs 140. Operations 124, 126, and 128 can include insertions, deletions, and updates to records. An update operation may be accomplished by a deletion operation and an insertion operation.

Generally, embodiment 100 can function as follows. An operation 124 associated with a record uniquely identified by a GUID is received at server A 102. The operation involves an "unique" column, e.g., the operation involves a column that includes an attribute that is considered unique in the context of the database system, or otherwise identifies the column as unique. An operation may include a column for User_email, and the database system may treat the user_email values in that column as unique identifiers of records such that a user_email is unique and not duplicated in multiple entries of a database system. An in-memory attribute 130 associated with the operation 124 is inserted into memory 114 (if it does not already exist in memory 114). In-memory attribute 130 is broadcast to other nodes in the database system 100, e.g., server B 104 (in-memory attribute 132) and server C (in-memory attribute 134). Server B 104 caches in-memory attribute 132 in memory 118, and server C 106 caches in-memory attribute 134 in memory 122. Servers A 102, B 104, and C 106 are configured to disallow additional operations received at the servers for the uniquely identified record based on the presence of in-memory attributes 130, 132, and 134. Server A 102 applies the operation 124, logs 136 the performed operation in log A 142, and updates the data table 112. Servers B 104 and C 106 monitor log A 142 for the performed operation logged by server A 102, apply the log/operation to data tables 116 and 120, and servers B 104 and C 106 subsequently log 138, 140 the operation in log B 144 and log C 146, respectively. Servers B 104 and C 106 remove in-memory attributes 132 and 134 from memory 118 and 122, respectively, upon applying log A 142 (e.g., operation 124 logged in log A 142). Similarly, server A 102 removes in-memory attribute 130 from memory 114 based on server A 102 monitoring log B 144 and log C 146 for the performed operation.

Cloud computing file system 110 provides globally accessible resource sharing for servers A 102, B 104, and C 106 of system 100. Each node in the system 100 (e.g., servers A 102, B 104, and C 106) can access cloud computing file system 110. Server A 102 can create and update log A 142, server B 104 can create and update log B 144, and server C 106 can create and update log C 146. Additionally, any of servers A 102, B 104, and C 106 can read any of logs A 142, B 144, and C 146. Accordingly, server A 102 can monitor changes to log B 144 and log C 146, for example. A server can monitor changes in real-time to multiple logs simultaneously. Logs can be provided by the globally accessible cloud computing file system 110, although logs also may be stored on and provided by each of the servers, respectively. The globally accessible cloud computing file system 110 provides fully distributed, efficient resource sharing with minimized delay.

FIG. 2 is a diagram illustrating an example data table, in accordance with an embodiment 200. Data table 112 includes various columns GUID 202, User_email 204 having a unique attribute, First name 206, Last name 208, and so on as appropriate for data that is to be stored. Thus, data table 112 can store a record 210 comprised of GUID value 1217897128 212, User_email value d@domain.com 214, First name value John 216, and last name value Doe 218. Record 210 in data table 112 is stored in a master server (e.g., server A 102, see FIG. 1). Record 210 can be propagated/synchronized to data tables of other master servers (nodes, e.g., servers B 104 and C 106) in a multi-master database system. Propagating and synchronizing record 210 can be facilitated using GUID 202.

Global Unique Identifier (GUID)

GUID 202 can ensure that each GUID is globally unique, across multiple linked database systems. The column for GUID 202 can be hidden, enabled, or disabled. GUID 202 can be generated in advance or on-demand. GUID 202 can be part of a primary key of a table, or can itself be used as a primary key.

GUID 202 can be a database data type. Internally, a database management system can involve a GUID generator, such as a function to generate a GUID based on a seed that ensures almost no chance of creating duplicate GUIDs. A seed can indicate how many digits to generate for the GUID value. This can be expressed as GUID (seed) to generate the GUID value. As illustrated in FIG. 2, the GUM value 212 is 10 digits long. The GUID 202 can also be based on which database is used to generate the GUID 202, referred to as a shard indicator. This can be expressed as GUID (seed, shard, shard_ID) to generate a unique GUID with a sharding feature. For a ten-node multi-master RDBMS system, the shard is 10 and the shard_ID is chosen from 0 . . . 9 based on which server generates the GUID 202. For example, a sharding function call GUID (10, 10, 8) indicates the seed is 10 digits, there are ten nodes, and the GUID was generated at server node 8 (shard_ID=8). GUID (10, 10, 8) can be used to generate the GUID value 1217897128, indicated as GUID value 212 in FIG. 2.

GUID 202 can be used as a primary key, or part of a primary key. The GUID 202 assures uniqueness such that data conflicts are avoided. Some database systems may require a primary key to be meaningful. For example, a customer information system may use an email address column as a meaningful primary key. A GUID 202 can be hidden and associated with the email address to provide uniqueness across the multi-server environment. Additionally, an "in-memory" attribute can be used to avoid duplicate entries.

In-Memory Attribute

FIG. 3 is a diagram illustrating an example memory containing an in-memory attribute, in accordance with an embodiment 300. Memory 114 can be used to store in-memory attribute 302, using columns including Server_ID 304, Nodes 306, Table_Column 308, Timestamp 310, Value 312, Left/Count 314, Log_ID 316, and so on. In-memory attribute 302 is associated with Server_ID A 318, Nodes 10 320, Table_Column User_email 322, Timestamp 1287682532 324, Value d@domain.com 326, Left/Count 10 328, Log_ID 012345-123 330, and so on. In-memory attribute 302 stored in memory 114 of server A 102 (see FIG. 1) can inform server A 102 to disallow incoming operations 124 on records associated with in-memory attribute 302.

The columns of in-memory attribute 302 enable information to be shared and data conflicts to be avoided throughout the multi-master database system. Server_ID 304 can indicate a server that originated an operation associated with in-memory attribute 302. Nodes 306 can indicate the number of nodes/servers in a database system. Table_Column 308 can indicate a column in a server's data table that is associated with an operation and, for example, that the column needs to be unique. Timestamp 310 indicates the time associated with the operation that triggered the in-memory attribute 302. Timestamp 1287682532, reference number 324 in FIG. 3, corresponds to a date/time of Oct. 21, 2010 17:35:31. Value 312 indicates the information to be applied in the operation associated with in-memory attribute 302. For in-memory attribute 302, the value d@domain.com 326 corresponds to Table_Column_User email 322, as reflected in FIG. 2 for record 210. Left/Count 314 can indicate the number of servers/nodes in the database system that need to apply the operation associated with in-memory attribute 302, so that in-memory attribute 302 can be removed from its server. Log_ID 316 can indicate the position in a log file of the server corresponding to the operation associated with the in-memory attribute 302.

As shown in FIG. 3, left/count 314 can be set initially to the total number of nodes 306 in the system, which is 10 for the embodiment of FIG. 3. Each time a server in the system applies the operation associated with in-memory attribute 302, left/count 314 can be decremented by one. In-memory attribute 302 remains in memory until left/count 314 reaches zero, at which point it is removed from memory. When left/count 314 reaches zero, this indicates that all servers in the database system have applied the operation. Thus, the record corresponding to the operation is synchronized across the database system at each of the servers, such that the in-memory attribute 302 is no longer needed to disallow further operations associated with the record. Accordingly, the possibility of a data conflict is prevented prior to committing data, because additional operations to the record can be disallowed by the in-memory attribute while the operation is being applied at each of the servers.

In-memory attributes can be broadcast quickly and efficiently among servers in a database system, letting those servers know that information needs to be shared. For example, other servers can be informed that a first server has received an operation to be performed on a record. When a first server operates on a record, other servers can be notified quickly to disallow operations on that record until the first server is finished and the operation has been propagated to all other servers. The in-memory attribute 302 can be used in modes of synchronization that are asynchronous, avoiding conflicts when data is not updated simultaneously at all servers (e.g., synchronizing by one a server applying a log of another server).

In-memory attributes occupy server memory. To conserve memory usage and minimize response time, in-memory attributes are removed when no longer needed. Thus, server A 102 can remove an in-memory attribute associated with a received operation once it verifies that server B 104 and server C 106 (i.e., the other nodes in the database system) have applied the operation. Similarly, server B 104 or server C 106 can remove respective in-memory attributes corresponding to the operation received at server A, as soon as server B 104 or C 106 has applied the operation. Servers determine whether operations have been applied based on a globally accessible log associated with each server.

Globally Accessible Log

FIG. 4 is a diagram illustrating an example log, in accordance with an embodiment 400. Log A 142 can be stored at the cloud computing file system 110 (see FIG. 1) and can include various columns to identify operations that have been performed at server A 102. Three operations 402, 404, and 406 (inserts) are illustrated. Column Server_ID 407 indicates the server associated with an operation. Column Operation 408 identifies what type of operation was performed. Column Timestamp 410 indicates the time that the operation was performed. Column Value 412 indicates what value is associated with the operation. Column Table column 414 indicates the column of the data table 112 to which the value 412 should be applied. Additional columns may be provided as necessary to fully document the operations performed at the server.

Log A 142 includes information reflecting an operation to insert a record with the User_email d@domain.com, First name John, and Last name Doe. The timestamp values indicate that this information was received at the server simultaneously in one operation. Log A 142 is an example log that reflects the insertion of the record 210 shown in data table 112 of FIG. 2.

A globally accessible log contains all committed statements. Each server applies other servers' logs. The logs can be applied in parallel. The log file has a Server_ID prefixed in each statement. The Server_ID enables a server to apply statements of logs from other servers, while ensuring that the statement has not already been applied as an operation at that server directly. A log may include statements from multiple servers, but a server accessing that log can avoid applying statements prefixed with its own identifier. Logs can be used to minimize the amount of memory occupied by in-memory attributes, because a server can determine whether an in-memory attribute has been re-played in any other servers and remove that in-memory attribute from the memory queue.

The globally accessible log can enable a server to indicate a received operation that needs to be applied to other servers. A server can apply operations from other servers to the records of its own data table, by monitoring globally accessible logs from other servers to identify operations logged by other servers. A globally accessible log can enable changes to be replicated across servers synchronously and/or asynchronously. The GUID and in-memory attribute used in conjunction with the globally accessible log can assure uniqueness and prevent data conflicts prior to committing data to the data tables of the servers.

The globally accessible log can be stored using cloud computing, e.g., a cloud computing file system 110 (see FIG. 1). Cloud computing provides an environment where logs can be distributed and universally accessible across the world to any member of the database system. Embodiments can provide the ability to limit the accessibility to a globally accessible log(e.g., using permission attributes to grant/revoke access to files by specific servers and/or users, encrypting data, and the like). A globally accessible log may be stored on its associated server, which may control access to the log by other servers of the database system.

Globally accessible logs can enable a server to recover from down-time or other situations that cause a gap between servers in performed operations. For example, server B 104 may go offline for one hour and when back online, server B 104 may need to catch up with operations that occurred in the database system during the down-time of server B 104. Server B 104 can apply the log of server A 102 to catch up with server A 102. During the catch-up, server B 104 can disallow access to server B's data/data table 116. Thus, server B 104 can prevent an opportunity for data conflicts, before data has been caught up. Embodiments also enable servers to be added to or removed from the database system without needing to suspend operations on the entire database system.

Example Operation

The GUID, in-memory attribute, and globally accessible log can enable fully-distributed, efficient resource sharing across servers in a database system with minimized delays, as described in one embodiment below.

Figure 5:
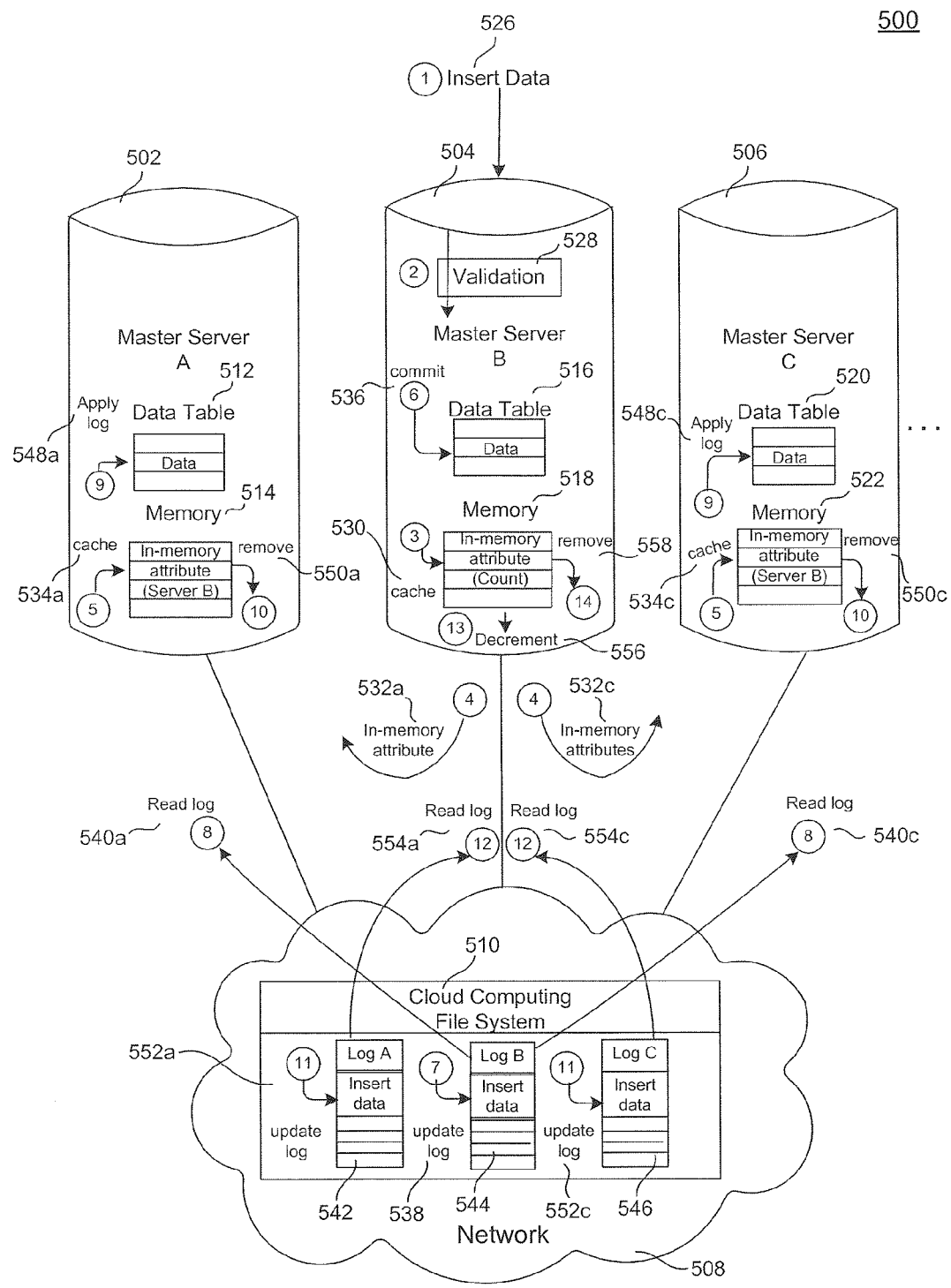
FIG. 5 is a diagram of an exemplary multi-master database system, in accordance with an embodiment.

FIG. 5 is a diagram of an exemplary multi-master database system, in accordance with an embodiment 500. Server A 502, server B 504, and server C 506 are illustrated as master servers, and are connected to network 508. Server A 502 includes data table 512 and memory 514. Server B 504 includes data table 516 and memory 518. Server C 506 includes data table 520 and memory 522. Servers A 502, B 504, and C 506 can interface with log A 542, log B 544, and log C 546 of cloud computing file system 510 on network 508.

An example operation for inserting data is as follows. Server B 504 receives an operation 526 to insert data. Server B 504 validates the data at validation 528. Since a column is associated with a "unique" attribute, an in-memory attribute is cached 530 in memory 518. The cached in-memory attribute contains Server_ID B indicating that the operation 526 to insert data originated at server B 504. The in-memory attribute also contains a count of the servers in the database system. FIG. 5 illustrates three servers, so count equals three for the in-memory attribute in memory 518 upon caching 530 the in-memory attribute. The operation/data is associated with a GUID to ensure that the operation/data is uniquely identified throughout the database system.

The In-memory attribute is broadcast 532a to server A 502, and broadcast 532c to server C 506. An in-memory attribute is broadcast to all other servers in the database system, although only two additional servers are illustrated in the embodiment of FIG. 5. When broadcast, the in-memory attributes indicate the server originating the operation. Thus, in-memory attributes cached 534a at server A 502, and cached 534c at server C 506, indicate server B as originating the in-memory attribute. The in-memory attributes cached at memory 514 and 522 indicate to server A 502 and server C 506 that instructions received at server A 502 and server C 506 regarding the cached data should be disallowed until the in-memory attributes are removed.

After broadcasting the in-memory attribute to the other servers in the database system, server B 504 updates 538 log B 544 to indicate that server B successfully performed the data insertion. Then server B 504 commits 536 the data to data table 516. When Log B indicates that the operation is performed, server B 504 decrements the count of the in-memory attribute from three to two. The count therefore indicates that two servers remain to commit the data before the in-memory attribute can be removed from the memory 518 of server B. Although the steps including caching, broadcasting, committing, decrementing, updating, and so on have been described as set forth herein, embodiments can perform the steps of FIG. 5 in different order than what is specifically described.

Servers A 502, B 504, and C 506 can monitor the logs in cloud computing file system 510. Thus, after server B 504 updates 538 log B 544, server A 502 can read 540a log B 544, and server C 506 can read 540c log B 544. Servers A 502 and C 506 identify that data was inserted based on the entry in log B 544. Servers A 502 and C 506 accordingly apply 548a, 548c the changes from log B 544 to data tables 512 and 520, respectively. Upon applying 548a, 548c changes from log B 544, servers A 502 and C 506 remove 550a, 550c the in-memory attribute. The removal is based on identifying that server B updated its log, corresponding to the origination Server_ID indicating server B in the in-memory attributes cached at servers A 502 and C 506. Once the in-memory attributes are removed 550a, 550c, servers A 502 and C 506 no longer disallow operations received at servers A 502 and C 506 regarding the data operation 526 (illustrated as a data insertion operation).

Upon successfully applying data to data tables 512 and 520 of servers A 502 and C 506, servers A 502 and C 506 update 552a, 552c log A 542 and log C 546, respectively. Server B identifies the updates to logs A 542 and C 546, by reading 554a log A 542 and reading 554C log C 546.

Server B 504 then twice decrements 556 the count of the in-memory attribute cached in memory 518, one decrement for the update to log A 542, and one decrement for the update to log C 546. The count thereby is decreased to zero. When the count reaches zero, server B 504 removes 558 the in-memory attribute from memory 518. Upon removing 558 the in-memory attribute from memory 518, server B 504 no longer disallows operations received at server B 504 regarding the data/record associated with data operation 526 (data insertion).

Figure 6:
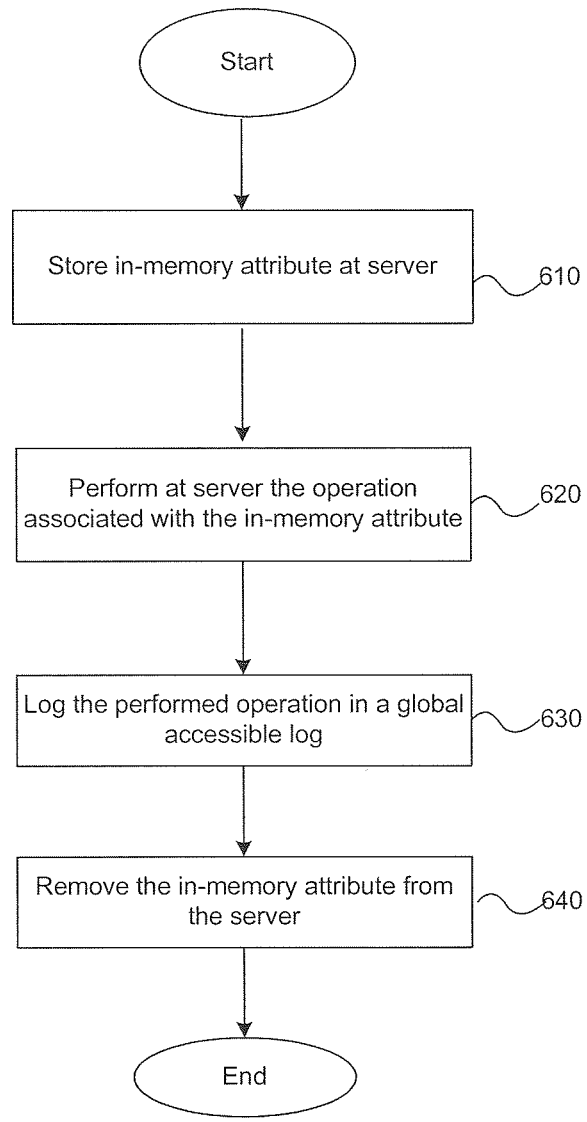
FIG. 6 is a flowchart of a method associated with an exemplary multi-master database system, in accordance with an embodiment.

FIG. 6 is a flowchart of a method 600 associated with an exemplary multi-master database system, in accordance with an embodiment. At step 610, an in-memory attribute is stored at a server. The server can be part of a multi-master database system. The in-memory attribute can be associated with an operation, a record, and a global unique identifier (GUID) assuring uniqueness across the database system. The in-memory attribute indicates disallowing at the server additional requested operations associated with the record. The in-memory attribute can be stored responsive to a requested operation at the server, and can also be stored responsive to a broadcasted in-memory attribute from the other servers in the database system. The in-memory attribute can indicate a count of servers in the database system, and can indicate which server broadcasted the in-memory attribute.

At step 620, the operation associated with the in-memory attribute is performed. The operation can include inserting, deleting, and updating data records in a data table of a server. At step 630, the performed operation is logged in a global accessible log available to servers of the database system. At step 640, the in-memory attribute is removed from the server. The in-memory attribute can be removed based on accessing a global accessible log associated with at least one of the other servers in the database system. For example, accessed logs can indicate that other servers have committed the operation associated with the in-memory attribute. One or more servers can access the global accessible logs simultaneously.

Figure 7:
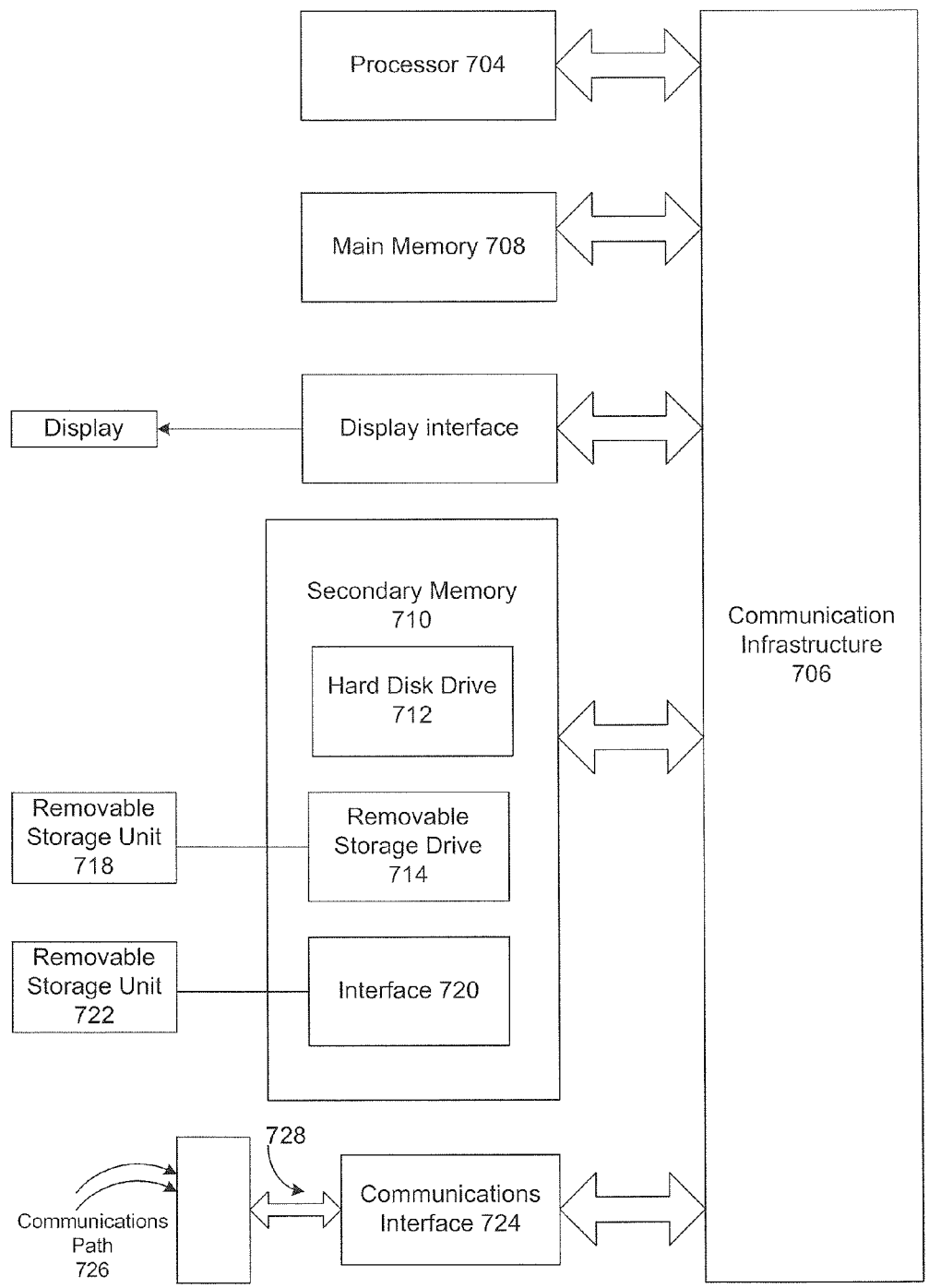
FIG. 7 is an example computer system used to implement exemplary embodiments of a multi-master database system.

FIG. 7 is an example computer system used to implement exemplary embodiments of a multi-master database system. Various aspects of the various embodiments can be implemented by software, firmware, hardware, or a combination thereof. FIG. 7 illustrates an example computer system 700 in which an embodiment, or portions thereof, can be implemented as computer-readable code. Various embodiments are described in terms of this example computer system 700. After reading this description, it will become apparent to a person skilled in the relevant art how to implement embodiments using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712 and/or a removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art(s), removable storage unit 718 includes a tangible computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724.

Communications interface 724 allows software and data to be transferred between computer system 700 and external devices. Communications interface 724 may include a modem, a network interface (e.g., an Ethernet card), a communications port, a PCMCIA slot and card, or the like. Software and data transferred via communications interface 724 are provided to communications interface 724 via a communications path 726. Communications path 726 may be implemented using wire or cable, fiber optics, a phone line, a cellular phone link, an RF link or other communications channels.

In this document, the teams "computer program medium" and "computer usable medium" are used to generally refer to media such as removable storage unit 718, removable storage unit 722, and a hard disk installed in hard disk drive 712. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement embodiments as discussed herein, such as the system described above. In particular, the computer programs, when executed, enable processor 704 to implement the processes of embodiments. Accordingly, such computer programs represent controllers of the computer system 700. Where embodiments are implemented using software, the software may be stored in a computer program product and loaded into computer system 700 using removable storage drive 714, interface 720, hard drive 712 or communications interface 724.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method comprising:
   storing an in-memory attribute at a server of a multi-master database system having a plurality of servers, the in-memory attribute including an operation, a record, a count indicating a number of servers that need to apply the operation, and a global unique identifier assuring uniqueness across the multi-master database system, the in-memory attribute indicating disallowing additional requested operations to the record at the server;
   performing at the server the operation included within the in-memory attribute;
   logging the performed operation in a server log contained within a global accessible log associated with the server and accessible to other servers of the multi-master database system, the global accessible log stored at a remote file system connected to the plurality of servers of the multi-master database system through a network, the global accessible log comprising a number of server logs equaling a number of the plurality of servers, each server log associated with a respective server, each respective server configured to log performed operations in its respective server log and monitor the other server logs;
   broadcasting the in-memory attribute to the other servers of the multi-master database system, the broadcasted in-memory attribute indicating disallowing additional requested operations to the record at each of the other servers receiving the broadcasted in-memory attribute;
   monitoring the server logs of the global accessible log associated with each of the other servers in the multi-master database system; and
   based on the monitoring of the server logs:
      when the count included in the in-memory attribute of the server for each server log indicates that a corresponding one of the other servers has applied the operation, decrementing the count within the in-memory attribute of other servers that need to apply the operation; and
      when the count equals zero, removing the in-memory attribute from the server after global accessible logs associated with the other servers indicate that the operation associated with the in-memory attribute has been performed at the other servers, the global accessible logs stored at the remote file system.

2. The method of claim 1, wherein at least one of the operation and the record is associated with a unique attribute.

3. The method of claim 1, wherein the in-memory attribute is stored responsive to a requested operation at the server.

4. The method of claim 3, further comprising:
   removing the in-memory attribute from the server when the count reaches zero, indicating that all other servers have applied the operation.

5. The method of claim 4, further comprising accessing in parallel the global accessible log associated with each of the other servers in the multi-master database system.

6. The method of claim 1, wherein the in-memory attribute is stored responsive to receiving a broadcasted in-memory attribute from at least one of the other servers in the multi-master database system, wherein the in-memory attribute indicates which other server broadcasted the in-memory attribute.

7. The method of claim 6, further comprising:
   accessing a global accessible log associated with the broadcasting other server prior to performing the operation;
   performing at the server the operation associated with the in-memory attribute according to the accessed globally accessible log; and
   removing the in-memory attribute from the server based on the accessed global accessible log indicating that the broadcasting other server has applied the operation.

8. The method of claim 1, further comprising disallowing storing the in-memory attribute at the server if an in-memory attribute associated with the operation is already stored in memory at the server.

9. The method of claim 1, wherein the global accessible log associated with the server indicates that the logged operation is to be performed by the other servers of the multi-master database system.

10. The method of claim 1, further comprising validating the operation prior to storing the in-memory attribute.

11. The method of claim 1, wherein the GUID functions as a hidden primary key.

12. The method of claim 1, further comprising generating the GUID based on a function and a seed value.

13. The method of claim 1, further comprising generating the GUID based on a shard indicator associated with the server.

14. The method of claim 1, wherein the global accessible log includes a server ID associated with each operation identifying the server.

15. The method of claim 1, wherein the multi-master database system is a Relational Database Management System (RDBMS).

16. A system comprising:
   a server including a non-transitory memory to store an in-memory attribute including an operation, a record, a count indicating a number of servers that need to apply the operation, and a global unique identifier assuring uniqueness across a multi-master database system having a plurality of servers, the in-memory attribute indicates disallowing additional requested operations to the record at the server, the server performing the operation of the in-memory attribute;
   wherein the server:
      logs the performed operation in a server log contained within a global accessible log associated with the server and available to other servers of the multi-master database system, the global accessible log stored at a remote file system connected to the plurality of servers of the multi-master database system through a network, the global accessible log comprising a number of server logs equaling a number of the plurality of servers, each server log associated with a respective server, each respective server configured to log performed operations in its respective server log and monitor the other server logs; and broadcasts the in-memory attribute to the other servers of the multi-master database system, the broadcasted in-memory attribute indicating disallowing additional requested operations to the record at each of the other servers receiving the broadcasted in-memory attribute;

monitor the server logs of the global accessible log associated with each of the other servers in the multi-master database system;

when the count associated with the in-memory attribute of the server for each server log indicates that a corresponding one of the other servers has applied the operation, decrements the count within the in-memory attribute of other servers that need to apply the operation; and when the count equals zero, removes the in-memory attribute from the server after global accessible logs associated with the other servers indicate that the operation associated with the in-memory attribute has been performed at the other servers, the global accessible logs stored at the remote file system.

17. The system of claim 16, wherein at least one of the operation and the record is associated with a unique attribute.

18. The system of claim 16, wherein the in-memory attribute is stored responsive to a requested operation at the server.

19. The system of claim 18, wherein the server is further configured to:
remove the in-memory attribute from the server when the count reaches zero, indicating that all other servers have applied the operation.

20. The system of claim 19, wherein the server is further configured to access in parallel the global accessible log associated with each of the other servers in the multi-master database system.

21. The system of claim 16, wherein the in-memory attribute is stored responsive to receiving a broadcasted in-memory attribute from at least one of the other servers in the multi-master database system, wherein the in-memory attribute indicates which other server broadcasted the in-memory attribute.

22. The system of claim 21, wherein the server is further configured to:
access a global accessible log associated with the broadcasting other server prior to performing the operation;
perform at the server the operation associated with the in-memory attribute according to the accessed globally accessible log; and
remove the in-memory attribute from the server based on the accessed global accessible log indicating that the broadcasting other server has applied the operation.

23. The system of claim 16, wherein the server is further configured to disallow storing the in-memory attribute at the server if an in-memory attribute associated with the operation is already stored in memory at the server.

24. The system of claim 16, wherein the global accessible log associated with the server indicates that the logged operation is to be performed by the other servers of the multi-master database system.

25. The system of claim 16, wherein the server is further configured to validate the operation prior to storing the in-memory attribute.

26. The system of claim 16, wherein the GUID functions as a hidden primary key.

27. The system of claim 16, wherein the server is further configured to generate the GUID based on a function and a seed value.

28. The system of claim 16, wherein the server is further configured to generate the GUID based on a shard indicator associated with the server.

29. The system of claim 16, wherein the global accessible log includes a server ID associated with each operation identifying the server.

30. The system of claim 16, wherein the multi-master database system is a Relational Database Management System (RDBMS).

31. A system comprising:
a plurality of servers, each having a respective non-transitory memory and configured to store an in-memory attribute including an operation, a record, a count indicating a number of servers that need to apply the operation, and a global unique identifier assuring uniqueness across a multi-master database system associated with the respective server, the in-memory attribute indicating disallowing additional requested operations to the record at the respective server; and a remote file system storing one or more global accessible logs associated with the plurality of servers;

wherein each server receiving the broadcasted in-memory attribute:
performs the operation included within the in-memory attribute of the respective server;
logs the performed operation in a server log contained within a global accessible log associated with the server and accessible to other servers of the multi-master database system, the global accessible log stored at the remote file system connected to the plurality of servers of the multi-master database system through a network, the global accessible log comprising a number of server logs equaling a number of the plurality of servers, each server log associated with a respective server, each respective server configured to log performed operations in its respective server log and monitor the other server logs;

broadcasts the in-memory attribute to the other servers of the multi-master database system, the broadcasted in-memory attribute indicating disallowing additional requested operations to the record at each of the other servers receiving the broadcasted in-memory attribute;

monitors the server logs of the global accessible log associated with each of the other servers in the multi-master database system; and based on the monitoring the server logs:
when the count associated with the in-memory attribute of the server for each server log indicates that a corresponding one of the other servers has applied the operation, decrements the count within the in-memory attribute of other servers that need to apply the operation; and when the count equals to zero, removes the in-memory attribute from the server after global accessible logs associated with the other servers indicate that the operation associated with the in-memory attribute has been performed at the other servers, the global accessible logs stored at the remote file system.

* * * * *